United States Patent

[11] 3,618,958

[72] Inventor John A. Schmidlin
West Orange, N.J.

[21] Appl. No. 9,352
[22] Filed Feb. 6, 1970
[45] Patented Nov. 9, 1971
[73] Assignee Arnet, Inc.
New York, N.Y.

[54] PHONOGRAPH RECORD WIPER
4 Claims, 6 Drawing Figs.

[52] U.S. Cl. .......... 274/47
[51] Int. Cl. .......... G11b 3/58
[50] Field of Search .......... 274/47; 15/231

[56] References Cited

UNITED STATES PATENTS

| | | | |
|---|---|---|---|
| 1,318,145 | 10/1919 | Harbaugh | 274/47 |
| 2,200,808 | 5/1940 | Purvis | 15/231 |
| 2,548,331 | 4/1951 | Yamashiro | 15/231 |

*Primary Examiner*—Leonard Forman
*Assistant Examiner*—Charles E. Phillips
*Attorneys*—Jerome Bauer and Myron Amer

ABSTRACT: A phonograph record wiper suspended from the phonograph arm in wiping relation with the grooved surface of a phonograph record, wherein the suspending connection permits unimpeded pivotal movement in the wiper of an extent which results in the automatic assumption by the wiper of an optimum wiping position in response to rotational movement of the phonograph record beneath the wiper.

INVENTOR
JOHN A. SCHMIDLIN
BY Jerome Bauer
ATTORNEYS

INVENTOR
JOHN A. SCHMIDLIN

BY [signature]

ATTORNEYS

PHONOGRAPH RECORD WIPER

The present invention relates generally to improvements for the handling of phonograph records, and more particularly to an improved wiper for removing dust and the like from a grooved record surface during a playing interval of operation of the phonograph.

The proper handling and care of a phonograph record necessitates the removal from the grooved playing surface thereof of dust, fingerprints and the like which, if not removed, interfere with the audio reproduction of the record. Known embodiments of wipers employ a brush mounted in wiping contact with the record playing surface in which there is sufficient rigidity in the individual bristles to maintain the wiping contact. This rigidity, however, could cause scratching or otherwise adversely effect the record playing surface and, in other respects as well, a brush is not an optimum record-wiping implement and does not provide completely satisfactory wiping performance.

Broadly, it is an object of the present invention to provide an improved phonograph record wiper overcoming the foregoing and other shortcomings of the prior art. Specifically, it is an object to provide a felt-type wiper body which is effectively maintained in an optimum line contact with the record in response to movement, during a playing interval, of the phonograph record.

A phonograph record wiper demonstrating objects and advantages of the present invention includes a planar body which is fabricated of felt or a similar material that is ideally soft and effective when used for wiping a fragile surface. The body is suspended in a pivotally articulating connection from the phonograph tone arm so that in response to record movement, the wiper body assumes a properly oriented wiping position relative to the record-playing surface in which there is an optimum line contact therebetween and also a confined area or compartment to receive the accumulation of dust and the like wiped from the grooved record surface.

The above brief description, as well as further objects, features and advantages of the present invention, will be more fully appreciated by reference to the following description of presently preferred, but nonetheless illustrative embodiments in accordance with the present invention, when taken in conjunction with the accompanying drawing, wherein.

Figure 1:
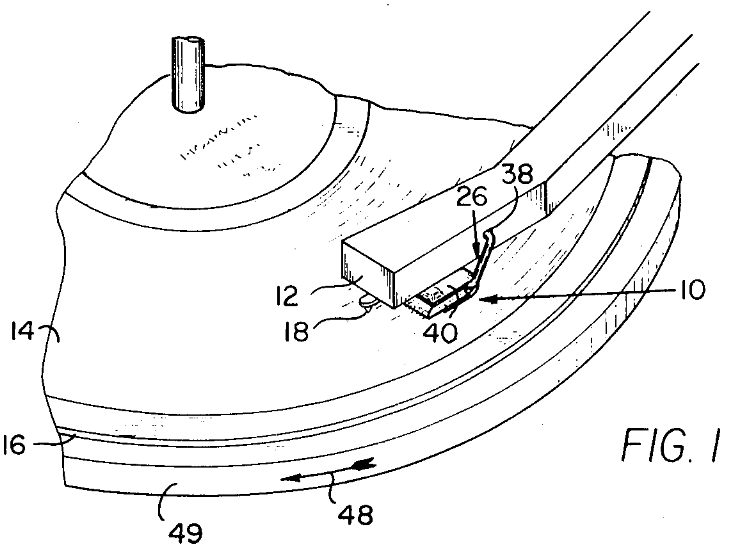
FIG. 1 is a partial perspective view of a first embodiment of a phonograph record wiper according to the present invention.
Figure 5:
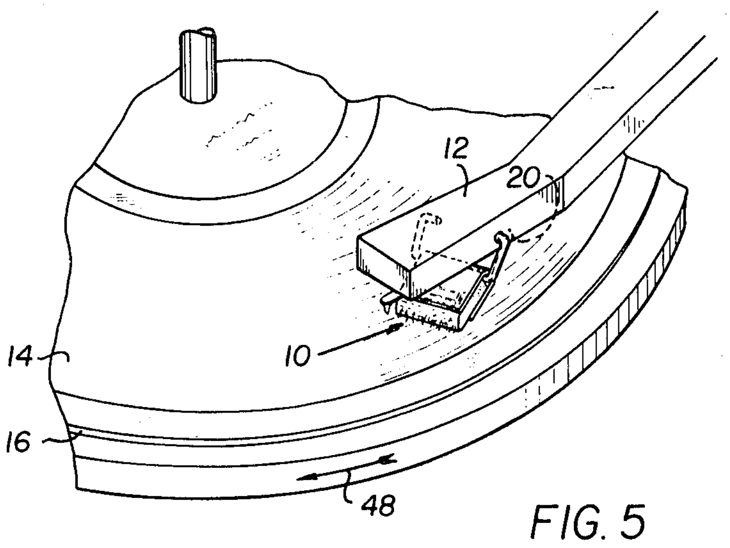
Figure 6:
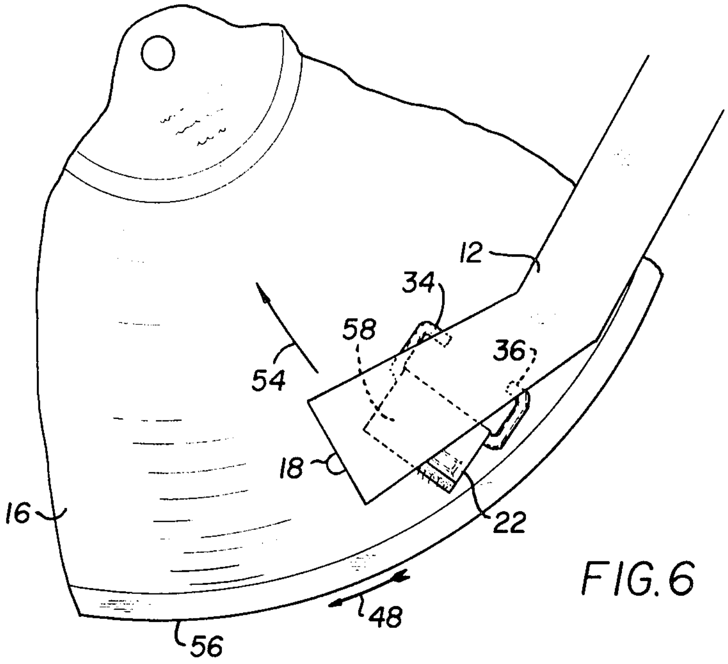

FIG. 5, like FIG. 1 is a perspective view, but of a second embodiment of the wiper; and FIG. 6 is a plan view illustrating further structural features of the wiper.

Reference is now made to the drawings, and in particular to FIG. 1, wherein a first embodiment of a phonograph record wiper, generally designated 10, is illustrated in its operative position suspended from a phonograph tone arm 12 in wiping contact with the grooved surface 14 of a phonograph record 16. As generally understood, the playing position of the tone arm 12, as illustrated in FIG. 1, is one in which the tone arm 12 occupies a clearance position above the Record-playing surface 14 and has audio playback contact with the surface via a phonograph needle 18 depending from a cartridge 19. Advantageously located in the clearance 20 beneath the tone arm 12 and suspended from this tone arm is the wiper 10 which is effective in wiping the record 16 free of dust, fingerprints and the like which, if not removed, interfere with the audio reproduction of the record. In accordance with the present invention, the wiper 10 is characterized by a construction which lends itself to economical mass production and which also results in an automatic adjustment in the position thereof relative to the record 16 so that wiping of the surface 14 is effectively and efficiently achieved.

Figure 2:
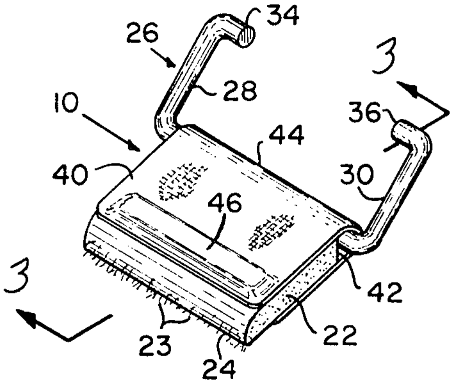
FIG. 2 is an isolated perspective view, on an enlarged scale, of the wiper illustrating further structural features thereof.
Figure 3:
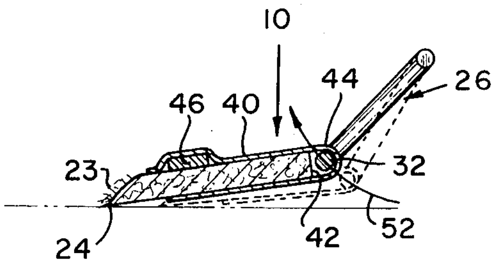
FIG. 3 is an elevational view, in section taken on line 3—3 of FIG. 2, illustrating still further structural features of the wiper.
Figure 4:
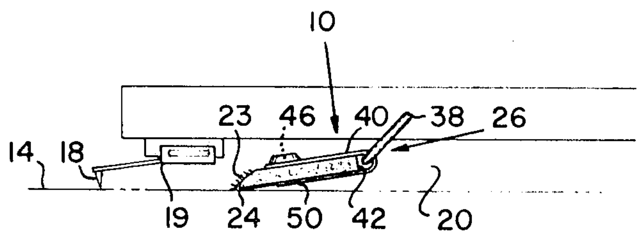
FIG. 4 is a side elevational view illustrating the wiper in wiping contact with a phonograph record.

Specifically, in the illustrated embodiment of the wiper 10 which is shown in greater detail in FIGS. 2–4, the wiper includes a generally rectangular planar body 22, fabricated as a fibrous mat out of felt or such similar material which is effective in wiping dust and the like from the playing surface 14 without scratching or otherwise harming the surface. In part, the effectiveness of this fibrous material as a wiper is attributable to the projecting fibers 23 thereof which extend into the record grooves 14 during wiping action. The felt body 22 has a depending wiping edge 24, the wiping function of which is aided by a progressively diminishing thickness in the edge 24.

The other major component of the wiper 10 is a generally U-shaped clip or connector 26 formed of two opposing side legs 28 and 30 and a connecting leg 32. Connector 26 is preferably fabricated of a springy wire or other such material so that in-turned projections 34 and 36, provided at the free ends of the legs 28 and 30, are adapted, under the urgency of the springy material, to snap in place within openings 38 (only one of which is shown in FIG. 1) which are provided in the sides of the tone arm 12 to accommodate the projections 34 and 36. In this manner, the operative position of the connector 26 is one in which it is suspended into the clearance 20 beneath the tone arm 12.

In a preferred construction of the wiper 10, use is made of an outer ply 40 preferably having an inner adhesive surface facilitating the wrapping of the ply 40 about the remote edge 42 of the felt body 22 so as to leave a loop 44 therein which advantageously accommodates the connecting leg 32 of the connector 26 while permitting unimpeded pivotal articulation in the felt body 22 relative to the connector 26. The significance of this will soon be apparent.

Completing the construction of the illustrated embodiment of the wiper 10 is a weighted member 46, preferably a small metal bar, which is located on the surface of the felt body 22 remote from the wiping surface which contacts the record playing surface 14. Weight 46 is held in place by the wrap of the outer ply 40.

From the foregoing it should thus be readily appreciated that there is a degree of articulation or pivotal movement in the wiper 10 by virtue of the pivotal connection thereof about the connecting leg 32 of the connector 26 and also about the axis of the engaging projections 34 and 36. During rotational movement 48 of the turntable 49 and thus of the record 16, there is of course wiping contact of the wiping edge 24 with the record-playing surface 14. Advantageously, this contact should be confined to the depending lowermost wiping edge 24. Stated another way, the wiping area should be restricted to edge or line contact and there should also be provided a wiping compartment or confined area 50 immediately to the rear of the edge 24 to receive the accumulation of dust wiped from the grooved record surface 14 by the wiping edge or surface 24.

Due to pivotal movement or articulation at the two locations 32 and 34, 36, respectively, there will be lifting movement 52 of the remote edge 42 of the felt body 22 in response to rotational movement 48 of the record 16. This is illustrated in FIG. 3 wherein the initial starting position of the wiper 10 is illustrated in phantom perspective and the subsequent operative position thereof in full line. The operative position, more particularly, is the result of clockwise rotation of the connector about the axis of the projection 34 and 36 and also a pivotal traverse of the felt body 22 about the axis or connecting arm 32.

Reference is now made to the second wiper embodiment hereof which is shown in FIGS. 5 and 6 and in which identical structural features are designated by the same reference numerals. Wiper 10 of FIGS. 5, 6 differs from that of FIGS. 1–4 in that the axis of the pivotal connection to the tone arm 12 that exists along the projections 34 and 36 is oriented at an angle to the longitudinal axis of the operative end of the tone arm 12 and to the radius of the record. Thus, during the initial radial traverse or movement 54 of the tone arm 12 toward and in overlying relation with the record edge 56, the rear corner 58 of the body 22 is in facing relation to this edge. If the clearance 20, therefore, is inadequate for the body 22 to clear the record edge 56, the angular contact of the body 22 against the edge 56, the angular contact of the body 22 against the edge 56 will result in forward pivotal movement of the body toward the needle 18. This, of course, properly lifts and causes the wiper to ride up and over the record edge and positions the wiper 10 for subsequent wiping action of the grooved surface 14 in response to rotational movement 48 of the record 16 beneath the wiper 10.

From the foregoing it should be readily appreciated that there has been described herein embodiments of a self-positioning record wiper 10 which is effective and efficient in wiping the record surface 14 free of dust or other interfering particles during the playing of the record 16.

A latitude of modification, change and substitution is intended in the foregoing disclosure and in some instances some features of the invention will be employed without a corresponding use of the other features.

I claim:

1. A phonograph record wiper for use with a tone arm in playing contact adjacent an end thereof with a rotating phonograph record and otherwise extending in a clearance position above said record, said wiper comprising a body constructed of an appropriate material for wiping dust from said phonograph record having an operative position located in said clearance beneath said tone arm and presenting a depending portion thereon in wiping contact with said record, and a substantially U-shaped member formed of opposite side legs and of an intermediate connecting leg having a first pivotal connection to said body and a second pivotal connection to said tone arm, said body being pivotally mounted on said connecting leg, said free end of said side legs pivotally engaged to said tone arm, whereby said first and second pivotal connections assume angles as a function of the speed of rotation of said record so as to confine the wiping contact between said body and said record to said depending portion of said body.

2. A phonograph record wiper as defined in claim 1 wherein said wiper body is a fibrous mat.

3. A phonograph record wiper as defined in claim 1 wherein said connector is fabricated of a resilient material so as to contribute to the engagement by said side legs thereof with a phonograph tone arm interposed therebetween.

4. A phonograph record wiper as defined in claim 1 wherein said wiper body is felt.

* * * * *

UNITED STATES PATENT OFFICE
CERTIFICATE OF CORRECTION

Patent No. 3,618,958 Dated November 9, 1971

Inventor(s) JOHN A. SCHMIDLIN

It is certified that error appears in the above-identified patent and that said Letters Patent are hereby corrected as shown below:

IN THE CLAIMS:

Claim 1, Line 13, before "pivotally" insert -- being --

Signed and sealed this 18th day of April 1972.

(SEAL)
Attest:

EDWARD M. FLETCHER, JR.
Attesting Officer

ROBERT GOTTSCHALK
Commissioner of Patents